Feb. 19, 1957

L. A. JOHNSON ET AL 2,782,077

MECHANICAL JOURNAL LUBRICATORS

Filed Jan. 20, 1955

United States Patent Office 2,782,077
Patented Feb. 19, 1957

2,782,077
MECHANICAL JOURNAL LUBRICATORS

Lloyd A. Johnson, Woodside, Dan A. Christensen, Palo Alto, and Antone D. Martin, Menlo Park, Calif., assignors, by mesne assignments, to Federal-Mogul-Bower Bearings, Inc., Detroit, Mich., a corporation of Michigan Application January 20, 1955, Serial No. 482,954

21 Claims. (Cl. 308—91)

This invention relates to journal assemblies and more particularly to a unique unitary device for lubricating the same and circulating large excess quantities of oil thereover to effect rapid cooling and for other purposes.

More particularly, the invention represents numerous improvements over our prior application for Letters Patent, Serial No. 415,468, filed on or about March 11, 1954, entitled Journal Lubricant Circulator. While this prior application discloses a construction which has operated at high efficiency under field conditions, yet we have found that certain hazards are occasionally encountered for which there is not as adequate a safeguard as desired. Moreover, the present design incorporates certain additional features and advantageous operating characteristics.

The present lubricant circulator is intended for use with heavy duty journal assemblies subject to extremely rough operating conditions including exposure to dirt and grit, wide temperature fluctuations, vibration, jolting, severe shocks, etc. Forced feed lubricating systems making use of pumps and pipelines are entirely unsuitable for such conditions. However, the construction disclosed below meets these rigorous requirements completely and in a manner not approached by any prior art design.

Among the primary objects of the present invention are those of providing a unitary lubricant circulator designed to be driven by the rotation of the journal and characterized by its simplicity, ruggedness, long operating life, dependability under all extremes of operating conditions, ease of installation and removal, and its low manufacturing cost.

A further and most important objective is the provision of an oil circulator which can be substituted for an entirely different type of lubricator in existing journal equipment with a minimum of effort and expense and, of particular note, without having to make alterations in the journal equipment.

Another object is the provision of a power driven circulator for use in a railway truck journal assembly for lubricating the journal as well as for greatly lowering its operating temperature by circulating excess quantities of lubricant over the journal and then over the inner walls of its housing from which it is quickly dissipated to the atmosphere.

Yet a further object is the provision of a journal lubricating device having a pair of rigid main frame members hinged together by a long axis hinge and supported by a pedestal projecting from the mid-length of the hinge whereby the device is free to open and close or pivot on its pedestal.

Another object is the provision of a novel readily disconnectable coupling for normally locking the circulator assembled to a journal housing while leaving it free to pivot and tilt without restraint within its intended orb of operation.

A further feature is the provision of an oil circulator employing resilient belts as the principal lubricant circulating means and embodying a positive safeguard against the displacement of the belts from their supporting pulleys. More particularly, the device is so constructed that the belts are held permanently assembled in their intended operating positions for the entire service life of the circulator and irrespective of whether the device is installed or packaged for shipment.

Still another feature of the invention is the provision of an oil circulator in which the belts and their supporting pulleys are fully protected by a supporting frame of rigid metal, and wherein the pulley axles and frame mutually cooperate to provide a rigid structure.

Numerous other objects and advantages of the invention will become readily apparent from the following detailed description of an illustrative embodiment taken in connection with the accompanying drawings, wherein.

Figure 1:
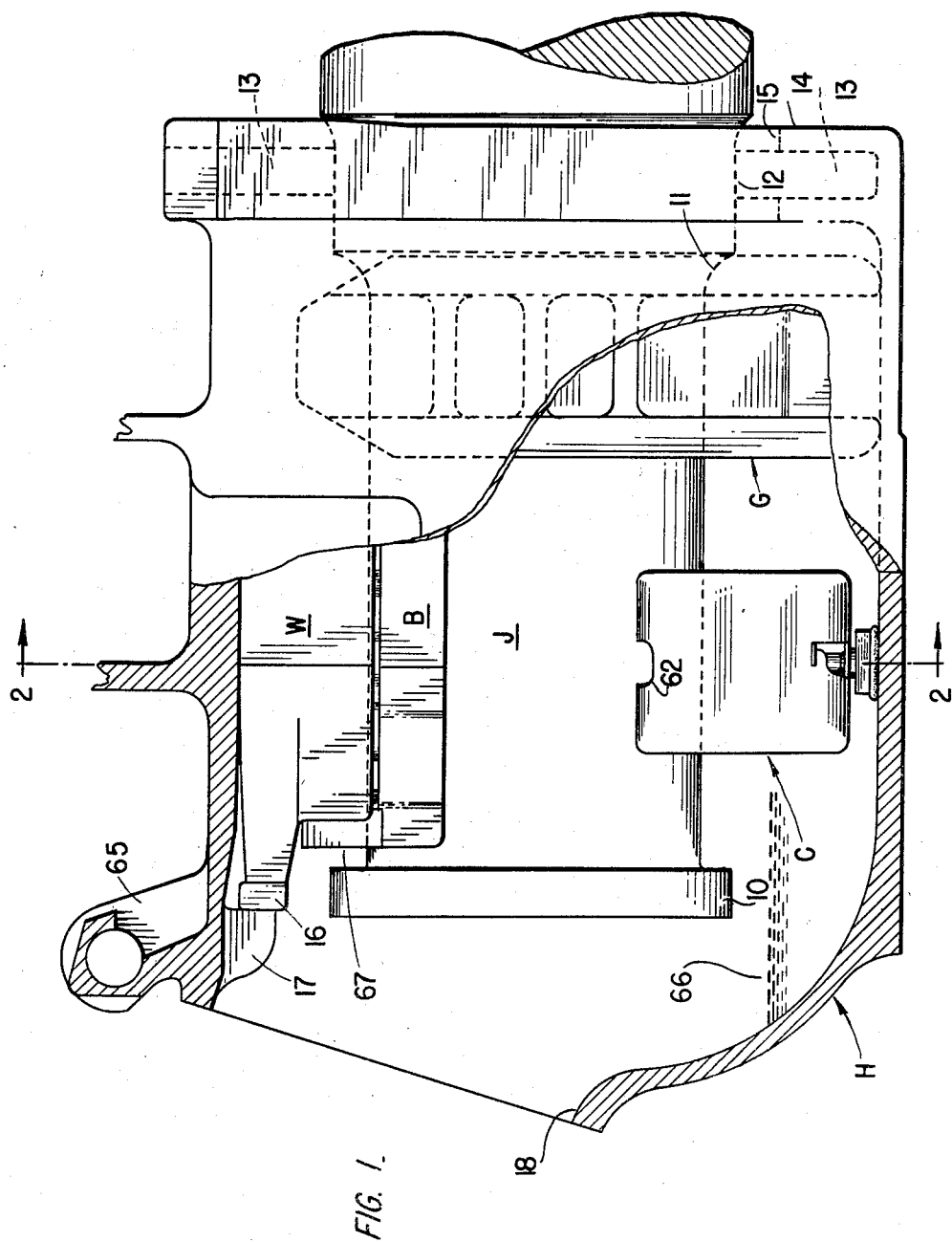
Figure 1 is a side view of a railway truck journal housing with the side wall broken away to show the position of the oil circulating unit in its installed operating position.

Referring to the drawings, it will be observed that the oil circulator device generally designated C is shown installed in the journal assembly of a truck commonly used to support the opposite ends of a railway car. Only a single housing of such a truck has been illustrated inasmuch as the trucks per se are of well-known conventional design and as such form no part of the present invention. The journal housing proper, generally designated by H and usually cast from steel or iron, provides an enclosure for the truck journal J. This journal projects trunnion-fashion from the outer face of each truck wheel. Interposed between the top side of journal J and the top wall of housing H is a bearing brass B and a locking wedge W. The remaining principal component of the assembly comprises a pair of guard bearings G which form a U-shaped barrier between the lower side of the journal and the lower half of housing H to restrict the movement of the journal relative to its housing.

Figure 2:
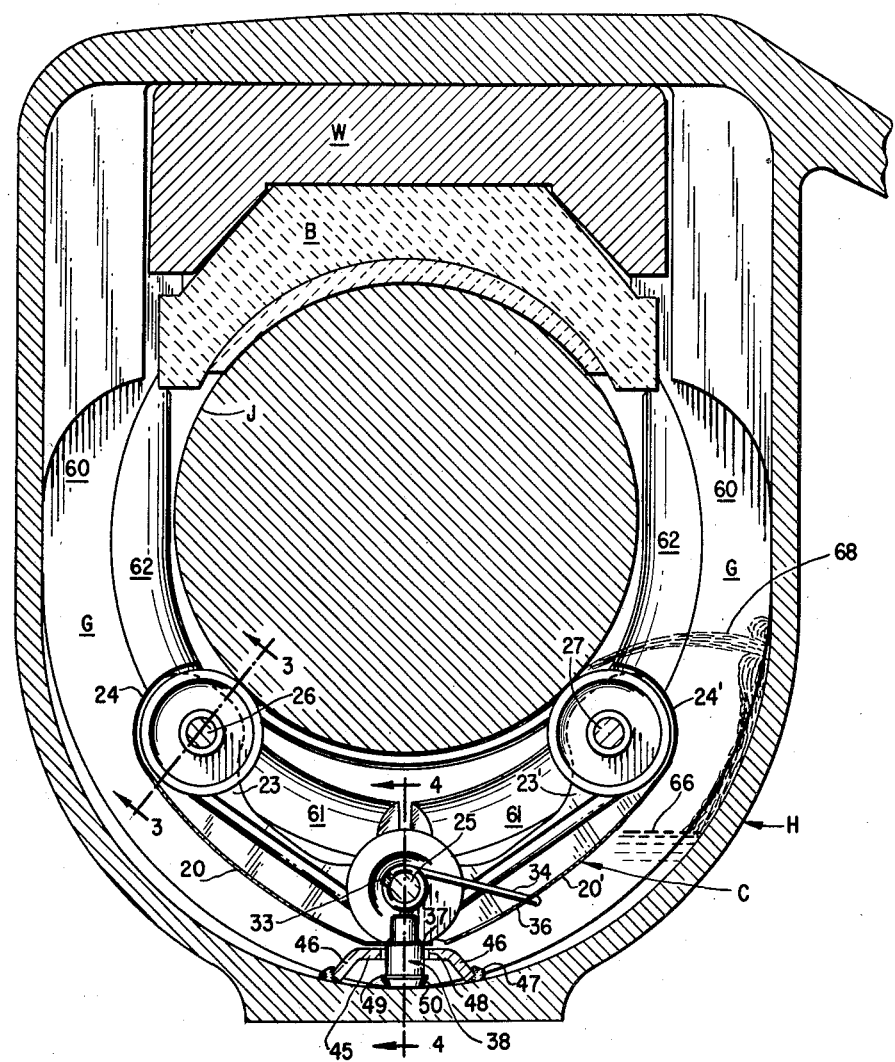
Figure 2 is a vertical sectional view through the journal housing taken along line 2—2 on Figure 1 to show certain constructional details.

As best shown in Figure 2, journal housing H is generally U-shaped in cross-section. Journal J projects into this housing through a pair of large diameter openings in the rear end wall and is substantially totally enclosed thereby. A heavy thrust flange 10 at the forward or outer end of the journal provides a stop against which the front end 67 of brass B abutts during the operation of the car. The rear end of the journal merges through a fillet 11 with a larger diameter sealing lip collar 12. As shown in Figure 1, collar 12 projects beyond the opposite sides of a narrow dust guard well 13 formed between the double-walled rear end 14 of housing H. It will be understood that a suitable fluid-tight oil sealing ring is intended for use in this well in lieu of the more conventional and unreliable dust guard devices. A suitable oil seal includes annular flexible lips seating against collar 12. However, since this device forms no part of the present invention, it need not be described further, other than to say that it provides a seal for the one-half inch or greater radial gap between collar 12 and the edges of the large diameter opening 15 through rear end 14 of the journal housing.

Resting freely on the top side of the journal is a thick slab-like bearing or brass B formed of suitable bearing material. This bearing is somewhat shorter than the length of journal J and permits of limited axial movement of the journal relative to housing H. Interposed between brass B and the top wall of housing H is a locking wedge W having portions interlocking with lugs projecting inwardly from the upper sides of all journal housings as an aid in limiting relative movement. Disassembly of the parts is accomplished by jacking up housing H until the forward end 16 of wedge W will slide forwardly past locking boss 17 carried by the interior top wall of the housing. Once this wedge has been removed, brass B can also be removed and the journal may be withdrawn through the rear end of the housing.

The lower portion of housing H is sufficiently deep to provide a reservoir for a pool of lubricating oil. Heretofore, this reservoir has been filled to a level slightly below the lowermost edges of openings 15 in the rear end wall and the space between the bottom of the housing and the lower side of journal J is packed with absorbent material such as cotton waste. This waste acts as wicking transferring oil from the reservoir to the underside of the journal. This practice, though in general use for many, many years, has proven most unreliable for many obvious reasons but has remained in use for lack of a more reliable substitute.

The present invention makes it possible to substitute a completely reliable mechanical lubricating and oil circulating device C in place of the cotton waste. Device C is a unitary, self-contained assembly having the general appearance of a clam shell since it consists of two cupped casing members hinged together along their lower edges and urged toward closed position by a strong spring associated with the hinge. The generally similar casing members 20, 20' may be formed from stamped sheet metal. Each casing half comprises a wide web portion having upstanding side flanges 22, 23, 22', 23' along its opposite edges. The webs curve slightly from their lower hinged end to their upper ends and, as made clear by Figure 2, the upper ends 24, 24' of the webs are of cylindrical shape through an arc of approximately 150° for a purpose which will become evident presently.

Figure 4:
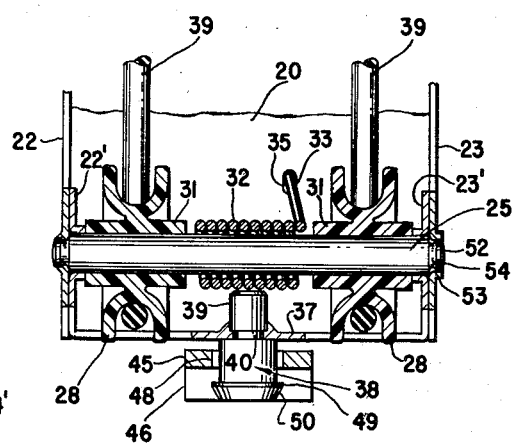
Figure 4 is a sectional view of the circulator taken along line 4—4 on Figure 2.

The lower ends of the casing members are hinged together on a transverse axis by means of an axle pin 25 extending through the nested lower ends of flanges 22, 22', 23 and 23', as clearly shown in Figure 4. While the axle or hinge pin may be secured in place in any suitable manner, it is most advantageous to use a permanent assembly technique at all joints to avoid any possibility of the parts becoming disconnected in service as well as safeguarding the parts against repair or replacement in the field by personnel not adequately informed. The importance of this safeguard will be readily appreciated when it is borne in mind that lubricant failure at a single journal of a train can be the cause of a wreck costing tens of thousands of dollars in property damage and possibly loss of life.

Similar axles 26 and 27 interconnect the upper ends of the flanges on each casing along the axis of curvature of cylindrical webs 24, 24'. Loosely supported near the opposite ends of each axle are grooved pulleys 28 and 29. The pulleys 28 on axle 25 are identical while those on axles 26 and 27 differ from pulleys 28 but are identical to one another. The combined length of hubs 30 for a pair of pulleys 29 is slightly less than that of the main portion of axles 26, 27 and serve to hold the pulleys properly spaced. On the other hand, the hubs 31 of pulleys 28 are much shorter to provide room in the midportion of axle 25 for a stiff torsion spring 32. One end 33 of this spring projects through an opening 35 in the lower web portion of casing 20 and acts in a direction to urge the casing clockwise as viewed in Figure 2. The other end 34 of the spring seats in a notch in the web of casing 20' and acts to rotate it counter-clockwise toward casing 20.

Substantially the only difference between casing members 20 and 20' is the shape of the cutaway portion of the web adjacent their hinged ends. Thus, casing 20 has a tab 37 centrally of its web which projects across the axis of the hinge and provides a support for a single vertically positioned pedestal generally indicated at 38. The corresponding lower portion of casing 20' is cut away along an irregular path to provide operating room for tab 37 and pedestal 38 when the casings are opened approximately 180° as usually required during the installation or removal of the circulator from the journal housing. However, care is taken to cut the webs in such manner that the edges terminate closely adjacent the rims of pulleys 28 to prevent the escape of the belts carried by these pulleys, as will be described in greater detail presently.

Figure 3:
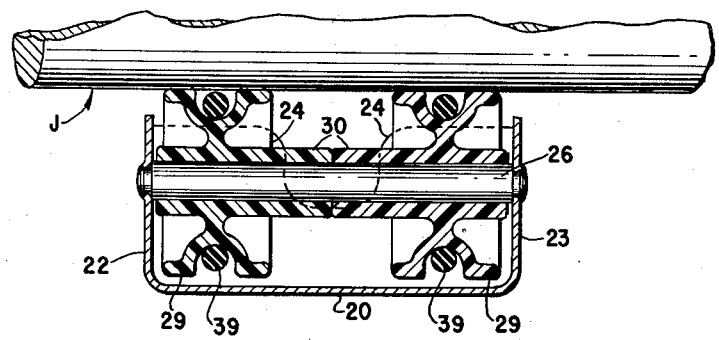
Figure 3 is a sectional view through the circulator taken along line 3—3 on Figure 2.

Referring to Figures 3 and 4, it will be observed that each group of three pulleys on the opposite ends of the axles supports a continuous belt 39. Preferably, the material employed is an elastic synthetic rubber highly resistant to attack by lubricating mediums, having great durability and which retains its suppleness over a temperature range of −45° F. to 250° F. There are presently commercially available several rubber compounds meeting these requirements.

While it is not essential that the belts be round in cross-section, yet this shape has numerous advantages. It is important that the ratio of the width to the thickness be approximately equal to one another, or not in excess of 1:2, or 2:1. One of the main reasons for this is that the more or less continuous axial movement of the journal crosswise of the runs of the belts tends to rotate the belts about their own axes. The relatively small diameter round cross-section facilitates this movement without imposing undue wear on the belts or without subjecting them to distortion or uneven wear. Furthermore, the area of contact between the belts and the journal remains constant. Various other advantages will be readily apparent upon analysis.

It will also be observed that the depth of the belt grooves in the pulleys is preferably slightly greater than the diameter of the belts, while the spacing between the rims of the pulleys and the adjacent portions of the casing members is appreciably less than the diameter of the belts. These design features likewise serve various purposes, but two of these are of particular significance. In the first place, the belts are positively held captive in the pulley grooves and cannot escape once the device has been assembled. In the second place, the spacing between the belt groove and flanges of pulleys 29, 29 and the adjacent wall portions of the casing cooperate to form a highly efficient fluid pump and flow channel for the oil as it is elevated into contact with the journal.

As regards the first of the above mentioned advantages, it will be quite apparent that it is important to hold the belts in place on the pulleys from the time of assembly of the lubricator in the factory until the circulator is in its installed operating position within the journal assembly. Otherwise, it would be extremely difficult, if not impossible, to keep the untensioned belts in the pulley grooves prior to being tensioned as an incident to installation in their operating position illustrated in Figure 2. And, of course, the belts are preferably designed to operate under slight tension at all times. However, this tension is completely relaxed if the lubricator is allowed to close through a relatively small arc since this shortens the distance between axles 26 and 27.

It is also most important that a positive safeguard be provided against the belts becoming displaced from the pulley grooves after the circulator has been installed. This is quite unlikely to occur under normal operating conditions and particularly at normal operating temperatures. But at very low operating temperatures, the congealing of the oil imposes an extremely high load on the belts not only tending to stretch them excessively but likely to force them out of the grooves and off the rims of the pulleys. This tendency is particularly pronounced at upper pulleys 29, but is positively prevented by the close proximity of cylindrical portions 24, 24' of the casing to the rims of the pulleys as well as to the sides of the journal as made clear by Figure 2.

The second principal advantage mentioned above, namely the forced circulation of oil, is an easily demonstrated phenomenon but is somewhat difficult to explain persuasively from a theoretical standpoint. Observation indicates that the movement of the belt at velocities normally encountered in actual use results in the upward flow of a stream of lubricant substantially filling the space between the inner side of the casing wall and the juxtaposed portions of the pulley rims and belt grooves. The potentialities of forced circulation of oil in a stream of this magnitude will be readily appreciated and will be commented upon below in connection with the mode of operation.

The sole support for circulator C consists of a pedestal 38. It comprises a shouldered screw machine part having a shank 39 extending upwardly through an opening in tab 37 integral with casing half 20. Shank 39 is provided with a groove 40 adjacent the juncture of the shank and the large diameter base of the pedestal. The opening in tab 37 for the shank is punched through in a manner to provide a low-height upstanding flange fitting loosely about the side of the shank. The pedestal is permanently anchored in place when a hollow die pin is telescoped over the end of the shank under sufficient pressure to force or coin the metal forming the flange on tab 37 downwardly into groove 40. This mode of assembly provides an unusually strong and permanent joint which can be made quickly at low cost. Conventional types of joints requiring up-setting or riveting of the pedestal itself could not be used because the pedestal pin is preferably case-hardened to prevent objectionable wear on its side walls or lower supporting end.

Pedestal pin 38 not only provides a one-point pivoting support for the circulator, but also incorporates a readily disconnectable coupling feature for locking the circulator in its installed operating position within the journal housing. To this end, a guard ring 45 of stamped sheet metal is provided having downturned rims 46 to support the mid-portion of the ring somewhat above the bottom of the oil reservoir of journal housing H. This guard ring is the only portion of the entire invention required to be permanently anchored to the journal assembly. This can be accomplished simply and quickly by spotwelding the edges of the rims 46 to the bottom of the housing after the guard ring has been properly positioned.

The raised central portion of the guard ring has an opening 48 of a diameter which is a few thousands larger than the diameter of the enlarged base 49 of pedestal 38. The lower rim of head 49 is chamfered at 50 to provide a pilot for guiding the pedestal into opening 48 during installation. However, once the pedestal is seated against the bottom of the journal housing, it will be quite apparent that it cannot become disconnected except by raising the circulator while the head 49 is held exactly centered in opening 48 of the guard ring. If not so held, the shouldered head will engage the edge of opening 48 and lock the parts in their assembled relation. Moreover, the spacing between the side walls of the pedestal and the edges of opening 48 permit free rotation of the circulator about its vertical axis as well as limited tilting through a small vertical angle in any direction. This angle is, of course, great enough to allow sufficient unrestricted movement of the circulator to follow the movement of journal J with respect to housing H.

Attention should also be called to the fact that the case-hardened axles 25, 26 and 27 are held permanently assembled between the side flanges of the casing halves in the same general manner as that just described in connection with pedestal 38. In other words, the opposite ends of the axles have shanks of reduced diameter as best shown at the right-hand end of axle 25 in Figure 4. Likewise, the adjacent portion of flange 23 is formed with an out-turned circular flange 53 closely fitting about shank 52. The base of shank 52 is formed with a shallow groove 54 into which flange 53 is deformed by a coining operation carried out under high pressure in the same manner described in connection with the joint of pedestal 38 with tab 37. This mode of locking the parts together avoids having to attempt riveting or staking the axle itself which should be case-hardened for strength and long wearing qualities with respect to the pulleys supported on it. The finished appearance of the joint between the axle and the casing is shown at the left-hand end of the axle in Figure 4 and at both ends of axle 26 in Figure 3.

Among the advantages of this method of axle and casing assembly are the following: Case-hardened axles can be employed without the need of coining or deforming the metal of the axle itself to form an interlock with the casing member; no extra parts are required; lost motion between the axle and casing member is eliminated; and the axle cooperates with the upturned flange of the casing members to reinforce and greatly strengthen the casing. Moreover, it will be clear that the lower axle 25 provides a support for the idler pulleys 28, 28, a support for the stiff torsion spring 32 as well as a long-axis hinge pivotally connecting the two casing or frame members 20 and 20' together.

Another important aspect of the invention is the use of a resilient non-metallic material for belt pulleys 28 and 29. While a number of plastic materials meet this need, we have found that the well-known and readily available plastic material known as nylon is especially suitable due to its toughness, good molding characteristics, high strength, resilience, resistance to attack by lubricants and unusually long wearing characteristics in frictional contact with metals. It will not abrade or score the journal. Its resilience enables particles of grit settling on its rim to be quickly discarded by contact with the journal, or to become embedded in the pulley itself. Hence, in either eventuality, the journal is safeguarded from injury. In tests made for the wearing qualities of this material, one of the pulleys 29 was frozen to shaft 26 so that it could not revolve. After being operated the equivalent of many thousands of miles, substantially no wear whatever could be detected in the portion of the rim in contact with the revolving journal J because of its anti-friction characteristics, particularly when aided by an oil film.

While not essential, it is highly advantageous to employ the oil circulator in combination with a pair of guard bearing members generally indicated at G in Figures 1 and 2. These members are described in detail in co-pending application for United States Letters Patent Serial No. 476,678, filed by Dan A. Christensen and Clifford A. Stephens on December 21, 1954, and to which reference may be had for a more complete disclosure. It suffices to state that these cast iron or steel members preferably comprise two identical members abutting at their lower curved ends to form an upright U-shaped assembly resting against the inner side and bottom walls of the journal housing and forming a rigid buffer between the lower half of the journal and the side walls of the journal housing. Each comprises a straight upright end 60 and an arcuate lower end 61 terminating beneath the center line of the journal. The inner face of each member includes a wide cylindrical surface having the same radius as journal J and formed of a suitable bearing material 62. Best results are obtainable when using a thick layer of the relatively hard synthetic rubber bonded to the guard members. This bearing material is normally out of contact with the sides of the journal but is closely spaced thereto. In consequence, any displacement of the journal housing with respect to the journal is arrested by one or the other of the guard members depending upon the direction of the displacement. A certain amount of movement is unavoidable and, in fact, desirable. However, excessive relative movement would cause unnecessary wear on the lubricating device, if not serious damage to the structure itself.

Accordingly, prior to the installation of circulator C, it is preferable to insert guard members G at the rear end of the journal housing with their upper ends 61 extending into the pocket formed between the rear end wall and the pair of lugs projecting inwardly from the upper corners of the side walls of all present-day journal boxes. When so installed, the guard members are held against displacement by interlocking action between their upper ends and the aforementioned lugs.

Figure 5:
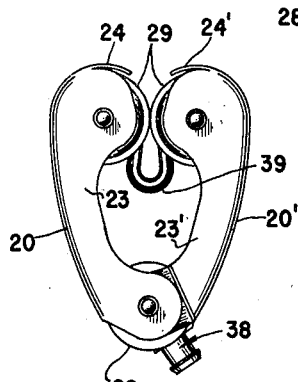
Figure 5 is an end view of the circulator showing it collapsed or in closed position prior to installation.

To install circulator C, the operator places the thumb of each hand in the notch 62 at the upper end of each casing half with the fingers overlapping the hinge at the lower ends of the casing. When so held, it is a simple matter to open the circulator from the closed shipping position shown in Figure 5 to the fully opened position with casings 20 and 20' lying in the same plane. The flattened circulator can now be inserted downwardly through access opening 18 at the front of the housing and worked around the lower edge of journal flange 10. A little experience on the part of the workman making the installation suffices to determine the proper manipulation required to make a speedy installation through this restricted passage. Once past flange 10, the operator may relax his grasp and allow spring 32 to close the pulleys 29 at the upper ends of the frame against the opposite lower sides of journal J.

The seating of pedestal 38 within guard ring 45 is most easily done by again opening the frames slightly and lifting the pedestal into alignment with the top of opening 48. As soon as it is in approximate alignment, the chamfered corner 50 of the pedestal guides it through the opening. Spring 32 is then effective not only to hold the pulleys firmly against the sides of the journal, but also to depress the pedestal firmly against the bottom of the journal housing.

By reference to Figure 2, it will be observed that the upper runs of belts 39 are cradled against the journal under slight tension. This provides excellent frictional driving contact between the belts and the journal as well as between the journal and the flanges of each of wheels 29.

Access opening 18 of the journal housing must be sealed tightly closed by any suitable cover device which may be pivotally supported from the usual pivot or hinge lug 65 overlying the top edge of the access opening. Prior to sealing the cover closed, the reservoir is filled with a suitable lubricating oil to the level indicated at 66 in Figure 1. This level is not critical and may vary widely without detriment or adverse effect on the lubricating efficiency or mode of operation of the oil circulator. It is quite essential, however, to use a fluid-tight sealing device between collar 12 and the walls of the dust guard well 13 at the rear end of the housing as well as for the access opening at the front of the housing for the reason that our circulating device floods the entire interior of the housing with a flowing film of oil. Consequently, the use of seals is imperative to circumvent loss of the entire oil supply after only a few miles of operation.

Movement of the railway car in either direction of course results in the rotation of journal J. This rotation immediately imparts movement to belts 39 and all six of its supporting pulleys. If the journal rotates clockwise, all pulleys will rotate counter-clockwise along with belts 39. Likewise, if the journal rotates counter-clockwise, then the belts and all pulleys will rotate clockwise.

A surprisingly thick layer of oil clings to the belts and is elevated from the pool into contact with the rotating journal. Other oil spreads out over the surface of the pulleys and is carried into contact with the journal or is flung from the rims of the pulleys by centrifugal action. A small portion of the oil is carried beneath the bearing brass B and is spread thereby the full length of the journal. The large excess portions reaching the brass cannot enter and flows to the opposite ends of the journal to flood both the end flange 10 as well as fillet 11 and sealing collar 12.

The importance of an adequate supply of oil at flange 10 and collar 12 will be appreciated from the following facts. As regards collar 10, experience has shown that the area of wear normally requiring replacement of the brass is across the front end 67 of the brass. The maximum depth of wear tolerated at either end of the brass is ¼ of an inch, or a combined wear of not more than ⅜ of an inch at both ends. The cause of wear in this area is the absence of lubrication when using the conventional and substantially universal cotton waste method of lubricating the journal. Oil circulator C provides such an excess of lubrication at this point that no appreciable wear is detectable during a period of use longer than that producing the maximum tolerable wear while employing the cotton waste mode of lubrication.

The excess lubrication provided at the rear end of the journal is almost as important. This lubrication is required to thoroughly lubricate the fillet end of the bearing brass so that it does not wear excessively by abrupt thrust contact with fillet 11. Lubrication of collar 12 is also most important to provide lubrication for the lips of the sealing device as well as to cool both collar 12 and the sealing device.

Reference was made in earlier parts of this specification to the fact that the lower runs of the belts cooperate with the pulley grooves, the flanges of the pulleys and the adjacent portions of the casing walls to constitute a pump for elevating a thick stream of oil into contact with the journal. Some idea of the volume and velocity of this stream can be gained from the fact that at operating car speeds of 10 miles an hour and greater, far more oil is lifted by the belts than can be carried away by the journal. As a result, streams of oil as large as a lead pencil rebound from the converging gaps between pulleys 29 and the journal and upwardly and outwardly against the side wall of the journal housing as indicated at 68 in Figure 2. Naturally, this action occurs on one side of the journal housing at a time depending upon the direction of journal rotation. Thus, if the journal is rotating clockwise, as viewed in Figure 2, the streams rebound outwardly to the right in the general manner indicated by 68. When the direction of rotation is reversed, streams similar to those indicated at 68 rebound outwardly from the pulleys on the left-hand side of the circulator.

Sudden displacement of housing H relative to the journal whether upwardly, to either side, or in some intermediate direction, has no influence whatever upon the operation of the oil circulator due to its elastic belts, hinged casing and universal mounting. Downward movement of the journal causes axles 26 and 27 to spread apart placing greater tension on spring 33 and increasing the tension on elastic belts 39. If the journal housing tends to twist in a horizontal plane relative to the journal, as frequently occurs while the car is negotiating a curve, the entire circulator pivots with the journal on pedestal 38 thereby maintaining all pulleys in firm frictional driving contact with the sides of the journal and without disturbing the uniform tension on belts 39. Any tendency to twist one axle out of parallel arrangement with the others is counteracted by the long hinge across the bottom of the clam-shell-like oil circulator.

The deep flanges 22 and 23 at either side of the frame members not only serve to stiffen the casings, but to protect the belts from injury from foreign objects and especially from inspection tools in the hands of inept field inspectors. The permanently sealed character of the assembly provides a positive safeguard against fastening devices otherwise required becoming loose or unsecured in the field. Of particular importance, the sealed construction provides a positive safeguard against any attempt to service the device in the field or to return a circulator to duty having part worn and part new elements. This would be false economy where a gamble with faulty lubrication cannot be tolerated or left to the discretion of repair crews.

While circulator C cannot possibly become dislodged from its installed position during use, yet it is a simple matter to remove it as a unit for inspection or replacement. This is done by opening the front closure device and lifting the circulator by hand until the head 49 at the bottom of pedestal 38 is in alignment with opening 48. Slight additional elevation at this point disconnects the coupling. Thereafter, the operator spreads the frame members, as during installation, and withdraws the unit upwardly around flange 10 and out through access opening 18.

Among the numerous other advantages of the circulator is the fact that no metal parts whatever can come in contact with the journal surface. Thus, only the rubber belts 39 and the non-metallic resilient pulleys 29 can touch the journal surface. Since each of these is of much softer material than the journal, no injury can be caused to the journal by them. Furthermore, the slight score marks and ridges usually present on the journal cause no harm to either the belts or the resilient supporting pulleys for obvious reasons.

The great excess of oil elevated to the journal by the belts and pulleys through centrifugal action as well as by direct transfer absorbs the heat of friction and is immediately flung by centrifugal action upwardly and outwardly against all interior surfaces of the housing. As it flows downwardly over the housing walls, the heat passes through the housing walls and is dissipated to the surrounding air. An idea of the effectiveness of the system for this purpose can be gained from the results of operating tests under load which demonstrated that the journal operates at approximately 60° F. lower temperature when using the present device than when using oil waste, the test conditions being otherwise identical.

Still another striking contrast between the present device and prior art constructions making use of mechanical lubricating devices is the fact that circulator C provides lubrication at the first turn of the journal even when the lubricant is congealed to a semi-solid state at temperatures of −30° to −40° F. At these temperatures, the oil can be dented with the finger but there is no noticeable tendency for the dent to disappear. The extended area of contact between the belts and the journal assures movement of the belts and the elevation of a thick layer of the plastic oil to the journal. However, this is impossible with the rollers alone even though the oil level is raised to submerge the lower rims of the rollers. The apparent reason for this is that the frictional contact between the rollers and journal is grossly inadequate to overcome the load imposed by the congealed oil. However, the frictional driving power between the journal and the taut elastic belts is more than adequate to overcome the drag on the belts produced by the congealed oil. And this is true even though all six pulleys remain stalled necessitating the slippage of the belts in the pulley grooves. This slippage occurs readily if the pulleys are made of nylon.

Manifestly, numerous changes in construction and the selection of materials can be made in practicing the invention without departure from the essential principles outlined above. Such changes will suggest themselves to those skilled in the art to which this invention relates without departing from the spirit and scope of the invention.

We claim:

1. In combination with a railway truck journal assembly of the type having a journal housing supported from the top side of a truck journal and an oil reservoir formed in the lower portion of the housing below the exposed lower side of the journal, that improvement which comprises: a mechanical oil circulator adapted to be driven by the rotation of the journal and operable in cooperation therewith to circulate large quantities of oil throughout the interior of said journal assembly, said circulator including a pair of channel shaped thin-walled frame members, means pivotally connecting the end of one frame member to the end of the other with the open side of the channels facing in the same direction, stiff spring means urging said frame members to pivot toward one another, axle means interconnecting the side flanges of said frame members adjacent the opposite ends thereof, pulleys mounted on said axle means, a plurality of narrow resilient belts encircling said pulleys, pedestal means carried by said frame members for supporting said circulator from the bottom of the journal housing with said frame members embracing the journal from the lower opposite sides thereof and with said journal cradled against the upper runs of said belts.

2. An oil circulator adapted to be held captive between the lower opposite sides of a railway truck journal and the bottom of the housing therefor, said circulator comprising a pair of rigid cupped frame members having upstanding flanges at the opposite edges of a wide web, hinge means pivotally connecting said members together at one end thereof, means supporting a plurality of pulleys between the flanges of said frame members, a plurality of narrow resilient belts supported by said pulleys, stiff spring means having its opposite ends bearing against said frame members and urging the pulley supporting faces of said members toward one another to relieve said belts of tension prior to the installation of the circulator in a journal assembly, pedestal means connected to said circulator centrally of its pivotally connected end for supporting the circulator from the bottom of a journal housing with the uppermost pulleys adapted to embrace the lower opposite sides of a journal and the upper runs of said resilient belts adapted to be stretched taut against the lower surface of the journal.

3. A collapsing, enclosed oil circulator unit adapted to be held in its expanded open operating position by a railway truck journal in cooperation with the bottom of the housing therefor, said circulator unit comprising a pair of clam-shell-like casing members hinged together near one edge, at least three pulley carrying axles supported parallel to said hinge between the interior side of said members, a plurality of narrow resilient belts encircling said pulleys in planes normal to said hinge, spring means urging said casing members collapsed against one another to enclose and protect said pulleys and belts before installation in a journal assembly, and support means projecting outwardly from said circulator adjacent said hinge for supporting said circulator from the bottom of a journal housing with said casing members opened and the upper runs of said belts and the pulleys adapted to be pressed firmly against the opposite sides of a journal by said spring means.

4. A collapsing enclosed oil circulator unit as defined in claim 3 wherein one of said axles forms the hinge means for said casing members.

5. A collapsing enclosed oil circulator unit as defined in claim 3 wherein said spring means is supported by said hinge means and has its opposite ends each bearing against one of said casing members at points spaced from the axis of said hinge means.

6. A journal-driven oil circulator for a journal assembly comprising a pair of sheet metal stampings each having a wide main wall and up-turned flanges at either side thereof formed to face one another with the flanges at one end of each nested in side-by-side relation, a hardened axle member having reduced ends extending through openings therefor in said nested flanges to form a hinge connection between said stampings, the end portions of said axles each having a groove therein, said stampings being held permanently assembled to said axle by metal of said flanges swaged into said grooves.

7. An oil circulator adapted to be cradled against the opposite lower sides of a railway truck journal so as to be driven thereby whenever the journal rotates, said circulator comprising a main casing formed by a sheet metal stamping, said casing being of generally arcuate shape and having upstanding tabs along its opposite edges for supporting a plurality of axles therebetween, a plurality of axles having shouldered ends projecting through openings in said tabs, said openings having small axially-projecting rims formed from said tabs, the shouldered ends of said axles having depressions adjacent said shouldered ends to receive said rims when swaged thereinto to form a permanent interlock holding said axles in assembled position.

8. An oil circulator as defined in claim 7 wherein said plurality of axles includes one at each opposite end of said generally arcuate casing and one substantially midway therebetween and parallel to each of the first mentioned axles.

9. An oil circulator as defined in claim 8 including a pair of grooved pulleys on each of said axles formed of a resilient non-metallic material.

10. An oil circulator as defined in claim 7 wherein said casing is formed in two halves held hinged together by one of said axles, each of said axles having at least one grooved pulley thereon, and a resilient endless belt of oil resistant elastomeric material encircling said pulleys and held captive thereon by said casing.

11. A journal-driven oil circulator comprising a pair of clam-shell-like thin-walled casings having an axle cooperating with the side walls thereof to form a hinge connection adjacent one edge thereof, torsion spring means coiled about said axle and having its ends urging said casings toward closed position, other axle means having their ends supported in the side walls of said casings parallel to and remote from said hinge axle, pulley means supporting narrow resilient belt means for rotation about said axles with one run of said belt means adapted to be stretched taut against a journal so as to be driven by the journal, and a pedestal carried by said circulator on an axis normal to said hinge, said pedestal having a flanged free end adapted to form an interlocking engagement with the mating member of a journal housing with which it is designed to operate.

12. A journal-driven oil circulator comprising a pair of clam-shell-like thin-walled casings hinged together adjacent an edge thereof, a plurality of pulley supporting axles supported between the side walls of said casings and in parallel with the axis of said hinge, and grooved pulleys on said axles cooperating with the walls of said casings to hold narrow resilient endless belts captive on said pulleys.

13. A journal-driven oil circulator as defined in claim 12 including a stiff spring having its ends connected one to each of said pair of casings on the opposite side of said hinge and urging said casings closed against one another.

14. A journal-driven oil circulator as defined in claim 12 wherein one of said pulley supporting axles forms the hinge pin for said casing hinge, a torsion spring surrounding the mid-portion of said axle and having its ends acting one against each of said casings urging the same toward closed position, and a pair of grooved pulleys of resilient non-metallic material mounted on said axle to either end of said torsion spring with the runs of said pulleys closely spaced from the interior walls of said casings whereby said belts are held captive in said grooves and whereby said casings serve as protective housings for said pulleys and belts and as supports for said axles.

15. A journal-driven oil circulator as defined in claim 12 wherein the hinge pin for said hinge comprises one of said pulley supporting axles, one of said thin-walled casings having a portion underlying the central portion of said axle and being radially spaced therefrom, a pedestal pin anchored to said casing portion on an axis normal to said last mentioned axle, the outer free end of said pedestal being tapered upwardly and merging with a shoulder to form a detent on said pedestal for detachably locking said pedestal in place beneath a keeper ring, said keeper ring being adapted to be anchored to the bottom of a journal housing oil reservoir.

16. A readily disconnectable coupling for detachably locking an oil circulator device in place in a journal housing comprising, a mechanical oil circulator device for assembly as a unit between the lower side of a railway truck journal and the bottom of the oil reservoir in the journal housing, said circulator device having a support projecting downwardly therefrom having a radial flange near its outer end, a cooperating keeper therefor adapted to have its outer rim anchored to the bottom wall of a journal housing with its central portion spaced above the bottom of the housing, the central portion of said keeper having an opening shaped to receive and freely pass the flanged outer end of said support and to thereafter lock the circulator against removal unless and until it is lifted and accurately oriented in co-axial alignment with said keeper opening.

17. A readily disconnectable coupling for an oil circulator device as defined in claim 16 wherein said radial flange extends entirely around the outer end of said support and forms the base of a frusto-conical end section of said support whereby said frusto-conical surface provides a pilot facilitating the assembly of the support to said keeper.

18. A unitary oil circulator device for use between the lower side of a railway truck journal and the bottom of the housing therefor, a single pedestal support for supporting said circulator, said pedestal projecting downwardly from the lower central portion of said circulator, an enlarged base on said pedestal having an outer wall tapering downwardly and inwardly toward its axis to provide an assembly pilot, and a keeper ring having an elevated central section provided with an opening large enough to freely pass said enlarged base so that the same may rest directly on the wall of a journal housing with said enlarged base on a lower plane than the plane of said keeper opening whereby the rim of said base may interlock with the rim of said keeper opening, said keeper being adapted to be anchored to the bottom wall of a journal housing whereby said support can be readily assembled into said keeper and be free to pivot as well as to tilt through limited vertical angles while being held captive by said keeper until elevated with the axis of said pedestal held coincident with the axis of said keeper opening.

19. A unitary oil circulator device adapted to be held captive between the opposite lower sides of a railway truck journal and the bottom of the journal housing therefor, said circulator comprising a pair of sheet metal casing members arranged end-to-end and having up-turned flanges along the sides of the intermediate web portions of said members, three axles supported between said sides with the middle axle forming a long axis hinge pivotally connecting the adjacent ends of said casings and the other axles being at the outer ends of said casings, pairs of grooved pulleys on said axles, a pair of round elastic belts supported by said pulleys, the web of said casing members being spaced from the pulley rims a distance less than the diameter of said belts whereby said belts are held captive on said pulleys, and stiff spring means urging said casing members toward closed position against one another, and means for supporting the hinged portion of said circulator on the bottom of a journal housing, said upper pulleys being adapted to be supported against the opposite sides of a journal with the journal cradled against the upper runs of said belts.

20. A unitary oil circulator device as defined in claim 19 wherein said pulleys are formed of resilient plastic material having a smooth surface whereby twisting, sliding or other relative movement between their rims and the surface of a journal when said circulator is in its assembled operation position within a journal assembly will not score or injure either the journal surface or said pulleys.

21. A unitary oil circulator device as defined in claim 19 wherein said belts cooperate with the closely spaced portions of the casing walls to form an oil conveying pump for elevating oil and projecting it upwardly from an upper pair of said pulleys when said belts are driven by a journal while the lower runs thereof are submerged in a pool of oil.

References Cited in the file of this patent

UNITED STATES PATENTS

| | | |
|---|---|---|
| 1,119,584 | Dutchman | Dec. 1, 1914 |
| 1,609,131 | Schneider | Nov. 30, 1926 |

FOREIGN PATENTS

| | | |
|---|---|---|
| 265,045 | Great Britain | Feb. 3, 1927 |
| 386,145 | Germany | Dec. 4, 1923 |
| 404,304 | Germany | Oct. 16, 1924 |
| 428,760 | Germany | May 12, 1926 |
| 451,266 | Germany | Apr. 19, 1928 |